(12) United States Patent
Chen et al.

(10) Patent No.: US 8,070,243 B2
(45) Date of Patent: Dec. 6, 2011

(54) ELECTRONIC DEVICE ENCLOSURE

(75) Inventors: Yun-Lung Chen, Taipei Hsien (TW); Rui-Peng Shen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 247 days.

(21) Appl. No.: 12/482,083

(22) Filed: Jun. 10, 2009

(65) Prior Publication Data

US 2010/0253186 A1 Oct. 7, 2010

(30) Foreign Application Priority Data

Apr. 3, 2009 (CN) .............................. 2009 2 030103

(51) Int. Cl.
 A47B 97/00 (2006.01)
 A47B 81/00 (2006.01)
(52) U.S. Cl. ................. 312/223.2; 312/265.5; 312/265.6
(58) Field of Classification Search ............... 312/223.2, 312/265.5, 265.6; 40/747, 762
 See application file for complete search history.

(56) References Cited

U.S. PATENT DOCUMENTS

| | | | | |
|---|---|---|---|---|
| 5,075,991 A | * | 12/1991 | Wenkman et al. | 40/781 |
| 6,862,174 B2 | * | 3/2005 | Chien et al. | 361/679.33 |
| 7,085,131 B2 | * | 8/2006 | Peng et al. | 361/679.32 |
| 7,114,694 B2 | * | 10/2006 | Li | 248/677 |
| 7,420,812 B2 | * | 9/2008 | Chen et al. | 361/724 |
| 7,440,272 B2 | * | 10/2008 | Chen et al. | 361/679.33 |
| 7,483,263 B2 | * | 1/2009 | Chen et al. | 361/679.02 |
| 7,483,264 B2 | * | 1/2009 | Chen et al. | 361/679.57 |
| 7,639,506 B2 | * | 12/2009 | Chen et al. | 361/747 |
| 7,663,873 B2 | * | 2/2010 | Lau | 361/679.39 |
| 7,719,829 B2 | * | 5/2010 | Li | 361/679.34 |
| 7,826,208 B2 | * | 11/2010 | Wang et al. | 361/679.26 |
| 2008/0136298 A1 | * | 6/2008 | Xiao | 312/223.2 |
| 2008/0239646 A1 | * | 10/2008 | Chen et al. | 361/683 |

* cited by examiner

*Primary Examiner* — Darnell Jayne
*Assistant Examiner* — Andrew Roersma
(74) *Attorney, Agent, or Firm* — Altis Law Group, Inc.

(57) ABSTRACT

An electronic device enclosure includes a bottom plate, a mounting member mounted to the bottom plate, and a resilient member attached to the mounting member. At least one bridge protrudes from the bottom plate. A gap is defined between the bridge and the bottom plate, and a protrusion is formed in the bottom plate. The mounting member includes a positioning tab capable of inserting into the gap along a first direction. At least one securing tab protrudes from a free end of the resilient member towards the bottom plate. The securing tab is capable of engaging with the protrusion of the bottom plate to prevent the position tab from removing from the gap along a second direction opposite to the first direction.

1 Claim, 4 Drawing Sheets

ELECTRONIC DEVICE ENCLOSURE

BACKGROUND

1. Technical Field

The present disclosure relates to an electronic device enclosure which can prevent an electronic device from sliding, while being convenient to assemble and disassemble.

2. Description of Related Art

Electronic devices such as computers usually include a plurality of components installed therein. A mounting base is usually installed on a computer enclosure for preventing the computer from sliding and vibrating on a desk, thereby protecting the components in the computer from damage. However, the mounting base is usually mounted on the computer enclosure with many fasteners passing through corresponding holes defined in the computer enclosure. This process, for both assembly and disassembly, is laborious, time-consuming, and inconvenient.

What is needed, therefore, is an electronic device enclosure which can prevent an electronic device from sliding and be conveniently assembled and disassembled.

DETAILED DESCRIPTION

Figure 1:
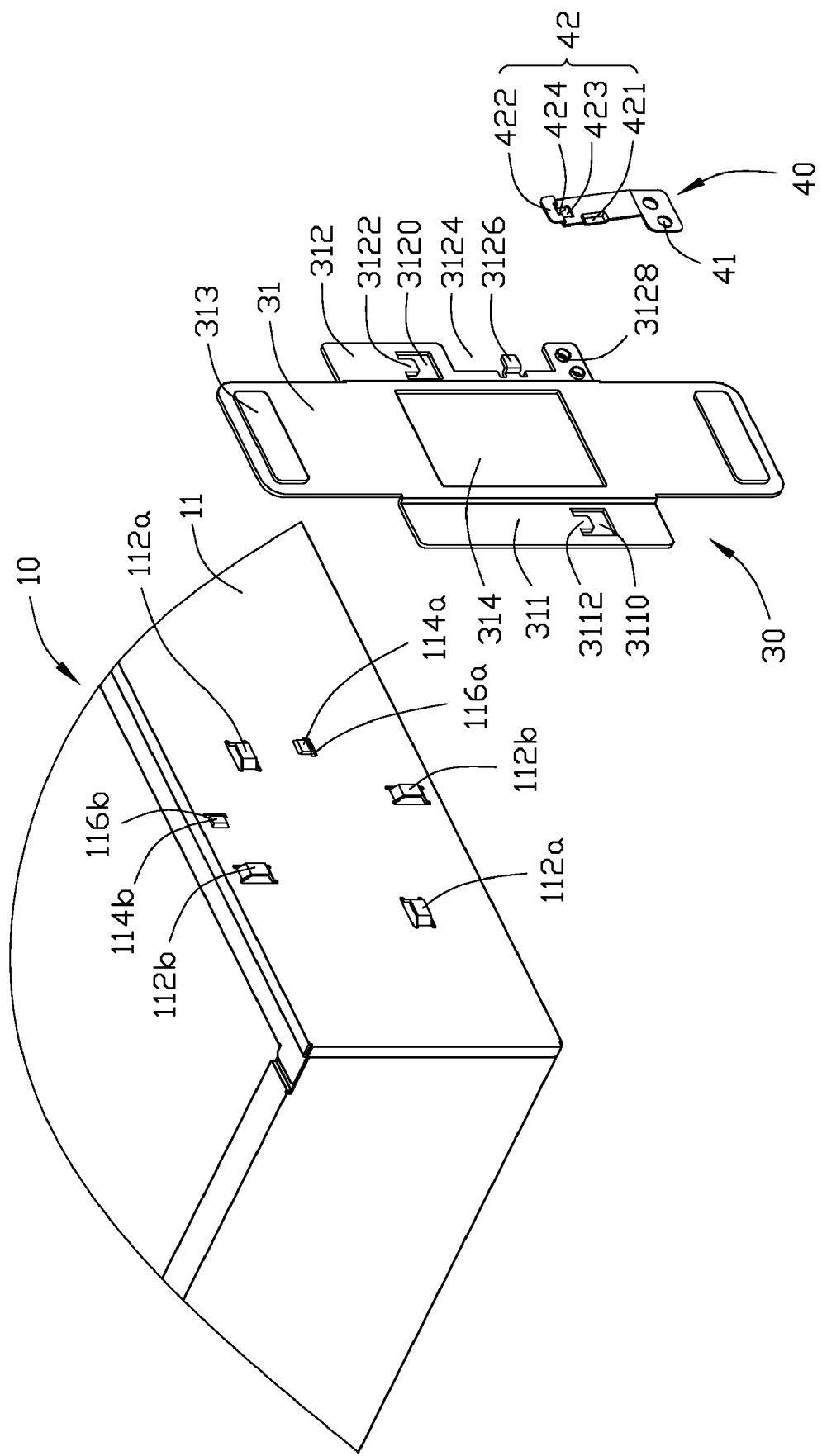
FIG. 1 is an exploded, isometric view of an embodiment of an electronic device enclosure.
Figure 2:
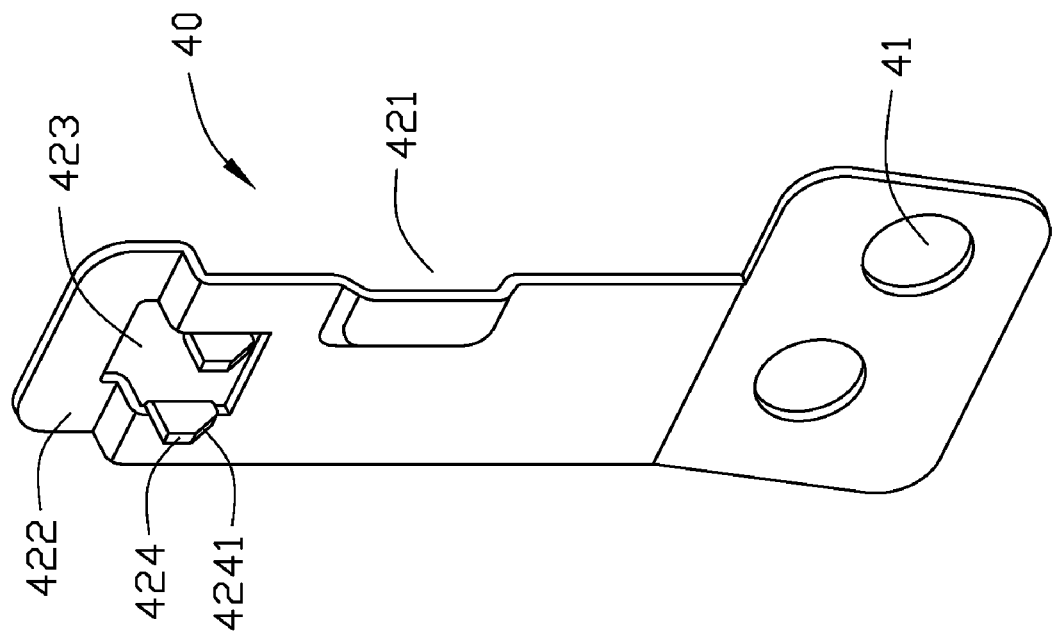
FIG. 2 is an isometric view of a resilient member of FIG. 1.

Referring from FIG. 1 to FIG. 2, an embodiment of an electronic device enclosure includes a chassis 10, and a mounting member 30 detachably mounted to the chassis 10.

Figure 3:
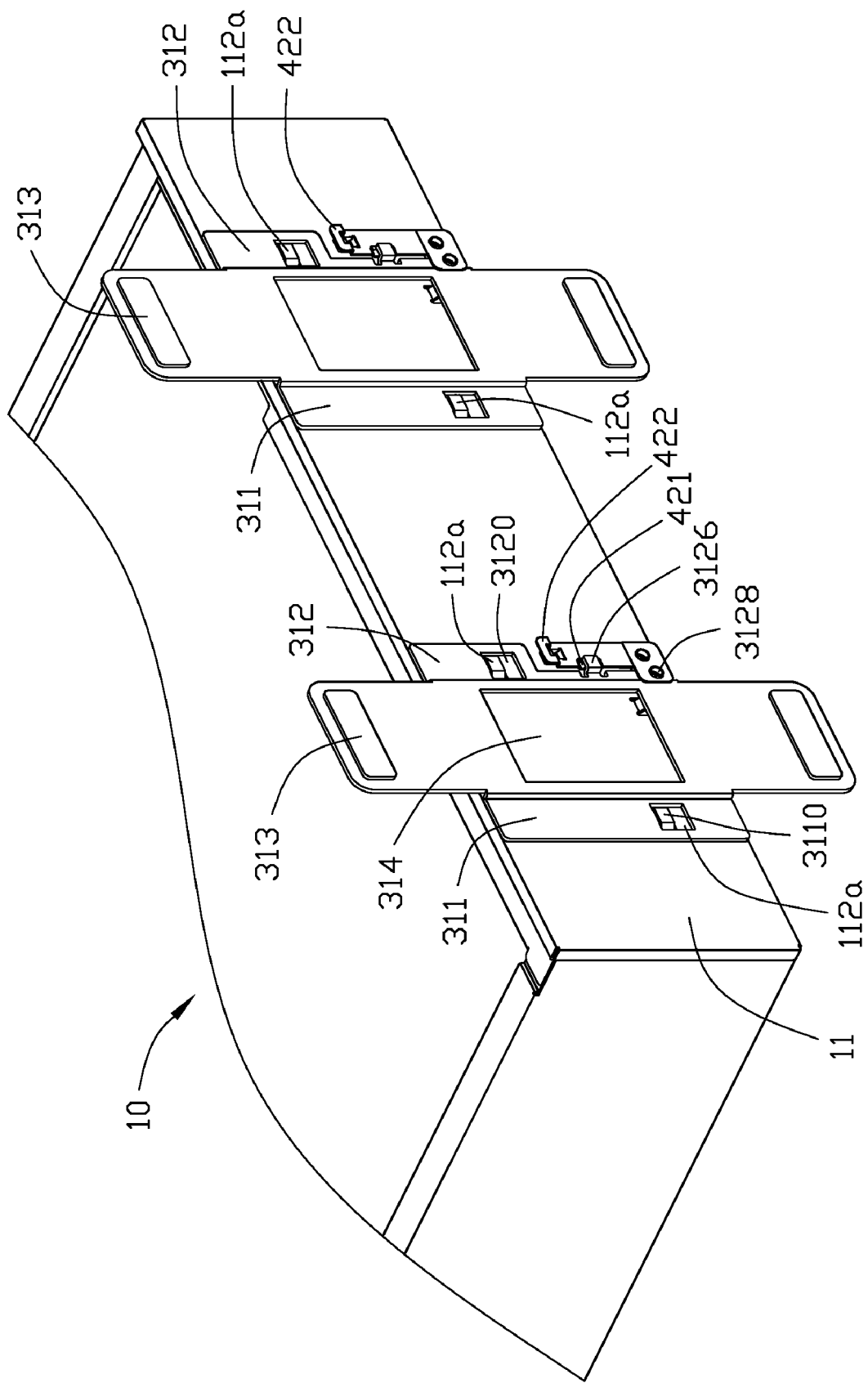
FIG. 3 is an assembled isometric view of the electronic device enclosure of FIG. 1.
Figure 4:
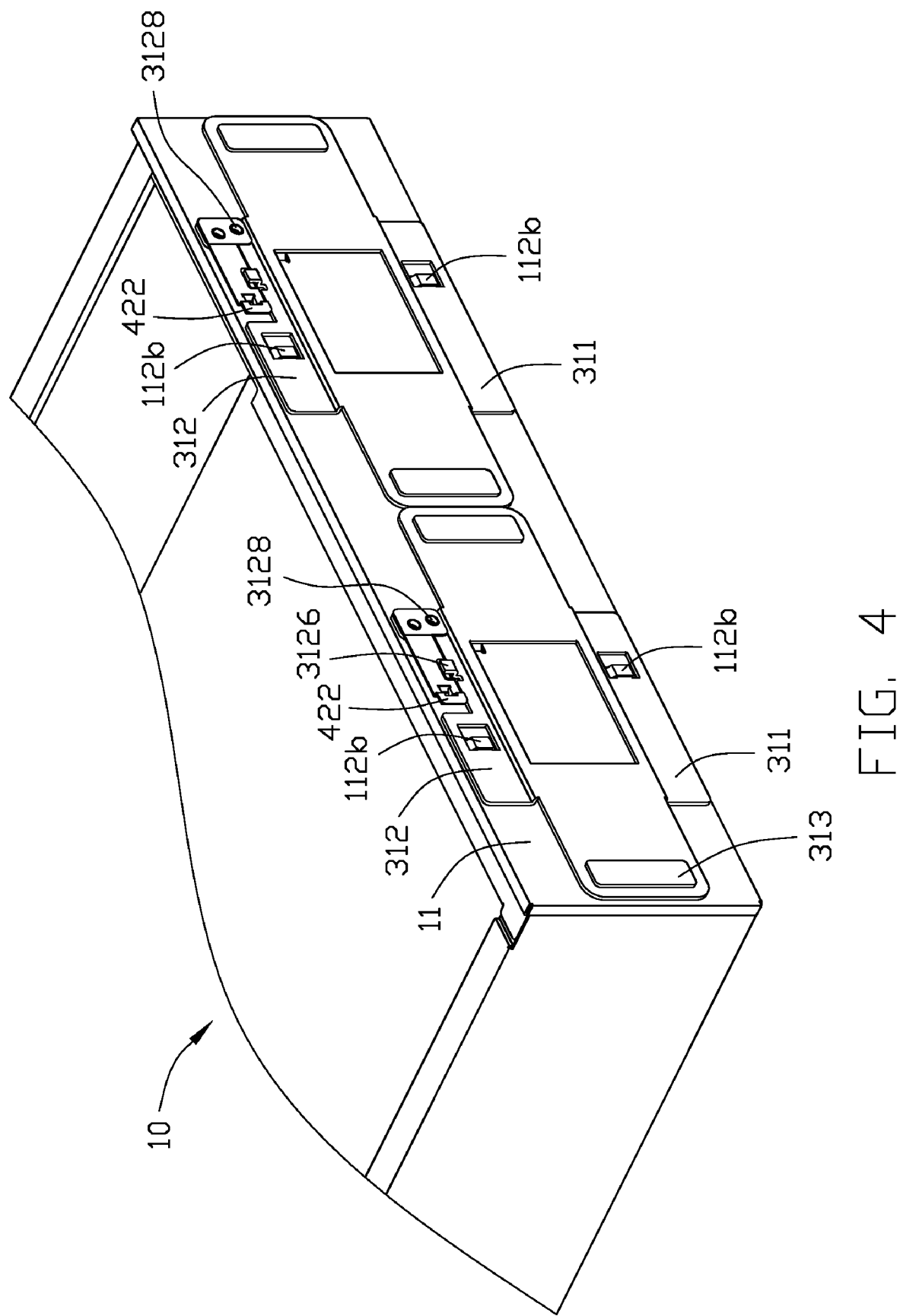
FIG. 4 is another assembled isometric view of the electronic device enclosure of FIG. 1.

The chassis 10 includes a bottom plate 11. On exterior surface towards one end of the bottom plate 11, two first bridges 112a protrude from the bottom plate 11. Two second bridges 112b perpendicular to the bridges 112a also protrude from the bottom plate 11. A gap is formed between each bridge 112a, 112b and the bottom plate 11. Two protrusions 114a, 114b protrude from the bottom plate 11, and two locating slots 116a, 116b are defined in edges of the corresponding protrusions 114a, 114b. Referring to FIG. 3 and FIG. 4, the same structure can be repeated toward the other end of the bottom plate 11, therefore two or more mounting members 30 can be mounted to the bottom plate 11 of the chassis 10.

Each mounting member 30 includes a rectangular panel 31, and two side panels 311, 312 extending from opposite edges of the panel 31. Each side panel 311, 312 has an L-shaped structure. Two assembly openings 3110, 3120 are correspondingly defined in the two side panels 311, 312. Two positioning tabs 3112, 3122 are correspondingly formed in the two assembly openings 3110, 3120. The two positioning tabs 3112, 3122 can be inserted into the corresponding gaps formed between the bridges 112a, 112b and the bottom plate 11. A receiving cutout 3124 is defined in the side panel 312, and a stopper piece 3126 is formed in the receiving cutout 3124. Two mounting posts 3128 protrude perpendicularly from one side of the side panel 312. Two pads 313, that can be made of rubber, are disposed toward opposite ends of the panel 31 for preventing the chassis 10 from sliding on a supporting surface. A through opening 314 is defined in a center of the panel 31.

A resilient member 40 is mounted to the two mounting posts 3128 of the side panel 312. Two assembly holes 41 are defined in one side of the resilient member 40 corresponding to the two mounting posts 3128 for mounting the resilient member 40 to the two mounting posts 3128 of the side panel 312. The resilient member 40 includes a resilient piece 42. The resilient piece 42 is capable of being received in the receiving cutout 3124. A notch 421 is defined in the resilient piece 42 corresponding to the stopper piece 3126 of the side panel 312. A bent handle 422 bends from the resilient piece 42, and an opening 423 is defined in the resilient piece 42. Two securing tabs 424 protrude perpendicularly from two opposite edges of the opening 423 corresponding to the protrusions 114a, 114b of the bottom plate 11. Each securing tab 424 has a trapezoid structure, and each securing tab 424 includes a guiding surface 4241.

Referring to FIG. 3, the assembly of only one mounting member 30 is described below but applies to two or more mounting members 30 as well. In assembly, the resilient member 40 is mounted to the side panel 312 of the mounting member 30 with the mounting posts 3128 securing into the corresponding assembly holes 41. The mounting member 30 is biased towards the bottom plate 11 of the chassis 10, the two side panels 311, 312 abut the bottom plate 11, and the guiding surfaces 4241 of the two securing tabs 424 abut on the protrusion 114a. Then the panel 31 of the mounting member 30 is biased towards the bridges 112a, the protrusion 114a presses against the guiding surfaces 4241 of the two securing tabs 424, and the resilient piece 42 is elastically deformed. When the guiding surfaces 4241 of the two securing tabs 424 slide through the protrusion 114a, the resilient piece 42 will come back to an original state, and the two securing tabs 424 are engaged in the locating slot 116a and blocked by the protrusion 114a. The positioning tabs 3112, 3122 are inserted into the corresponding gaps formed between the bridges 112a and the bottom plate 11 to secure the mounting member 30 to the bottom plate 11 of the chassis 10.

For disassembly, the bent handle 422 of the resilient member 40 is pulled away from the bottom plate 11, the resilient piece 42 is deformed elastically to disengage the securing tabs 424 from the locating slot 116a and the protrusion 114a, and the notch 421 is blocked by the stopper piece 3126. The mounting member 30 is pushed away from bridges 112a to disengage the positioning tabs 3112, 3122 from the corresponding gaps formed between the bridges 112a and the bottom plate 11. The mounting member 30 can then be removed from the bottom plate 11 of the chassis 10.

Referring to FIG. 4, in a second embodiment, the mounting member 30 and the resilient member 40 can be mounted to the bottom plate 11 with the two securing tabs 424 engaging in the locating slot 116b and blocked by the protrusion 114b, and the positioning tabs 3112, 3122 are inserted into the corresponding gaps formed between the bridges 112b and the bottom plate 11. The process of assembly and disassembly is the same as the process of first embodiment described above referring to FIG. 3.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electronic device enclosure, comprising:

a chassis comprising a bottom plate, the bottom plate comprising a substantially flat surface, at least a gap being defined in the bottom plate, and a locating slot being defined in the bottom plate;

a mounting member capable of being mounted to the bottom plate of the chassis, the mounting member comprising a positioning tab; and a resilient member mounted to the mounting member, at least one securing tab protruding from the resilient member;

wherein the positioning tab is capable of inserting into the gap for preventing the mounting member from moving along a first direction that is perpendicular to the substantially flat surface of the bottom plate, and the securing tab is capable of engaging with the locating slot for preventing the mounting member from moving along a second direction that is parallel to the substantially flat surface of the bottom plate;

the mounting member comprises a panel and at least one L-shaped side panel extending from the panel, an assembly opening is defined in the side panel, and the positioning tab is formed in the assembly opening;

two mounting posts protrude from the side panel, two assembly holes are defined in the resilient member corresponding to the two mounting posts for mounting the resilient member to the two mounting posts of the side panel; and a notch is defined in the resilient member, a stopper piece is disposed on the side panel corresponding to the notch for blocking movement of the resilient member away from the bottom plate.

* * * * *